US006617405B1

(12) United States Patent
Jorgensen

(10) Patent No.: US 6,617,405 B1
(45) Date of Patent: Sep. 9, 2003

(54) PROCESS FOR THE PREPARATION OF POLYETHYLENE

(75) Inventor: Robert James Jorgensen, Belle Mead, NJ (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 0 days.

(21) Appl. No.: 09/353,207

(22) Filed: Jul. 14, 1999

(51) Int. Cl.[7] .......................... C08F 4/44; C08F 210/02; B01J 31/14
(52) U.S. Cl. ................................ 526/123.1; 526/124.2; 526/153; 526/160; 526/348.6; 526/352; 502/104; 502/106; 502/132
(58) Field of Search ................ 526/123.1, 124.2, 526/153, 160, 352, 348.6; 502/104, 106, 115, 132

(56) References Cited

U.S. PATENT DOCUMENTS

| 4,482,687 A | 11/1984 | Noshay et al. ............... 526/125 |
| 4,508,842 A | 4/1985 | Beran et al. ................. 502/112 |
| 5,290,745 A | 3/1994 | Jorgensen et al. ........... 502/109 |
| 5,601,472 A | 2/1997 | Parker ........................ 446/475 |

FOREIGN PATENT DOCUMENTS

| EP | 417996 | 3/1991 |
| EP | 350170 | 3/1994 |
| EP | 635521 | 1/1995 |
| EP | 771820 | 5/1997 |
| EP | 0 771 820 A1 * | 5/1997 |
| EP | 783007 | 7/1997 |

* cited by examiner

Primary Examiner—Robert D. Harlan

(57) ABSTRACT

A process of polymerizing ethylene or ethylene and one or more comonomers in one or more fluidized bed reactors with a catalyst system comprising (i) a supported or unsupported magnesium/titanium based precursor in slurry form, said precursor containing an electron donor; and (ii) an activator containing aluminum in an amount sufficient to essentially complete the activation of the precursor is disclosed. In the process, the precursor and the activator are mixed prior to introduction into the reactor in at least one mixing procedure, and then the mixture is contacted again with additional activator to essentially complete activation of the precursor. In the method, the atomic ratio of aluminum to titanium is in the range of about 1:1 to about 15:1 and the mole ratio of activator to electron donor is about 1:1 to about 2:1, and no additional activator is introduced into the reactor(s).

6 Claims, No Drawings

PROCESS FOR THE PREPARATION OF POLYETHYLENE

TECHNICAL FIELD

This invention relates to a process for the preparation of polyethylene with a focus on catalyst activation.

BACKGROUND INFORMATION

Polyethylene has long been prepared with Ziegler-Natta catalyst systems, which typically include a catalyst precursor made up of transition metal(s) and an electron donor, and a cocatalyst. In order to obtain the high level of catalyst activity essential to commercial polymerization processes, it is necessary to provide for essentially complete activation of the precursor. It should be noted, however, that catalyst activity in these systems is also affected by a number of other variables including the method of catalyst manufacture or formation, the use of internal electron donors, the chemical composition of the internal electron donor, and the total amount of internal electron donor.

Once the basic catalyst is formed, it is necessary to remove internal electron donor from the vicinity of the active site and (if necessary) chlorinate and/or reduce the valence site of the active metal. Electron donor (ED) is complexed or reacted away from the active site by either activator compound (defined as an Al compound which is capable of reducing $TiCl_4$ to $Ti^{+3}$ valency; such compounds can be generically described as $R_nAlX_{3-n}$ wherein X is a halogen, typically Cl; n ranges from 1 to 3 with preferred values ranging from 1.5 to 3; and R is preferably $CH_3$, $C_2H_5$, $iC_4H_9$, $nC_4H_9$, $nC_6H_{13}$, or $nC_8H_{17}$) or by a Lewis acid (typically $R_nMX_m$ wherein n+m=the valency of M; R is an alkyl or alkoxy or aryloxy group; X is a halogen; and M=B, Al, or Si). The formula of a non-activator Lewis Acid can be $R_xBX_{3-x}$ wherein x=0 to 2. It is desirable to supply sufficient activator or Lewis acid to remove at least 90 percent and preferably close to 100 percent of the ED compound from the active site. Due to chemical equilibria, it may be necessary to add a greater than stoichiometric amount of activator compound to electron donor to fully activate the catalyst. Activation can be accomplished by partial activation before introduction of the precursor into the reactor and completion of the activation in the reactor by means of the cocatalyst, or full activation prior to introduction of the precursor into the reactor.

The disadvantages of partial activation lie in the requirement for additional process steps and equipment to provide the partially activated precursor followed by final activation in the reactor, which requires excessive amounts of activator compound, i.e., cocatalyst (typically, aluminum alkyl compounds), to be added to the reactor so that an adequate concentration of activator compound is present at the active polymerization site. As noted above, the function of this activator compound is to extract electron donor compound from the potential active site and to activate the active site either by alkylation (if the active site is already at the correct valence state) or by reduction and alkylation if the active site valence state requires reduction, for example, from $Ti^{+4}$ to $Ti^{+3}$. In addition to being wasteful, this excess activator compound can cause operational problems or detriment to the final product.

Typical preactivated catalysts are described in U.S. Pat. Nos. 4,482,687; 4,508,842; and 5,290,745. Preactivated catalysts of the prior art can be formulated with sufficient activator compound to fully activate the precursor composition; however, putting large amounts of activator compound directly onto these catalysts can also result in deactivation, catalysts which are hazardous to handle due to pyrophoricity, or catalysts which have poor flow properties. Some of these disadvantages can be addressed by dispersing the catalyst in a carrier such as an inert hydrocarbon; however, the disadvantage of needing multiple operations to produce the catalyst and the inability to adjust the final catalyst composition to account for variations in monomer quality are serious limitations for commercial operation. A further limitation for commercial operation is the need to dilute the catalyst sufficiently with the inert hydrocarbon to prevent deactivation of the catalyst due to high concentration of activator compound in the catalyst slurry.

The use of excess amounts of cocatalyst in Ziegler-Natta catalyzed polymerizations is standard practice in the art. Typical Al/Ti molar ratios used in prior art processes are usually greater than 20:1, and many are in the 50:1 to 100:1 range. In the description of these processes, lower values are mentioned, but clearly are not preferred. In other prior art, very low levels of added aluminum alkyl ranging from 0.1:1 to about 10:1 are suggested, but the catalyst systems involved here are devoid of electron donor type compounds, and so are not relevant to the processes under discussion in this specification. A typical non-ED system is described in U.S. Pat. No. 5,077,358.

Prepolymerization systems are also mentioned in the prior art. Typical examples of this kind of catalyst system are mentioned in U.S. Pat. Nos. 5,077,358 and 4,990,479. These systems also do not use internal electron donors, and addition of extra aluminum alkyl activator component can lead to catalyst productivity increases to such an extent that severe operational instabilities are observed. These catalysts are typically activated in the prepolymer preparation with low amounts of an aluminum alkyl activator compound and frequently with the use of an external electron donor. While "free" aluminum alkyl may be removed from the prepolymer prior to use in the main polymerization reactor, the prepolymer catalysts are fully activated in the reactor with large excess amounts of cocatalyst.

European Patent Application 783 007 discloses a process for production of polyethylene using reduced amounts of aluminum alkyl feed; however, this disclosure focuses exclusively on the use of external addition of additional activator compound, i.e., separate activator and catalyst feeds, and overall Al/Ti molar ratios, which are at the lower end of the higher ratios recited above for electron donor bearing catalysts. Operating in this mode introduces other specific problems, such as the need for exceptionally precise control of cocatalyst feed rates to avoid reaction runaway and agglomerate formation. A further disadvantage of "starved" activator feed is that the hydrogen response of the catalyst, i.e. the relative hydrogen:ethylene mole ratio required to achieve a given molecular weight at otherwise constant reaction conditions, is dramatically effected requiring larger amounts of hydrogen to achieve the same given molecular weight or melt index.

Although good polymerization activity is achievable by adding external activator compound, the fact that catalyst and activator compound are added separately requires excessive amounts of activator compound to keep the required amount of activator compound at the desired level at the active polymerization site. Excess activator compound also can cause formation of oils, can over-activate some sites thus forming highly branched materials which are undesirable, and can, in the extreme, actually cause catalyst activity decreases.

DISCLOSURE OF THE INVENTION

An object of this invention, therefore, is to provide a process for preparing polyethylene, which overcomes the deficiencies associated with separate and/or excessive addition of cocatalyst aluminum alkyl. Other objects and advantages will become apparent hereinafter.

According to the present invention, such a process has been discovered. The process entails contacting ethylene per se or ethylene and one or more comonomers in one or more fluidized bed reactors, under polymerization conditions, with a catalyst system comprising (i) a supported or unsupported magnesium/titanium based precursor in slurry form, said precursor containing an electron donor; and (ii) an activator in an amount sufficient to complete the activation of the precursor. The invention lies in an improvement to this process comprising (A) mixing the precursor and the activator prior to introduction into the reactor in two or three steps, the last step being a topping-off step in which activation is completed;

(B) maintaining the mixture from step (A) in slurry form; and (C) introducing the mixture from step (B) into the reactor with the following provisos:

(I) the atomic ratio of aluminum to titanium is in the range of about 1:1 to about 15:1 and the mole ratio of activator to electron donor is about 1:1 to about 2:1;

(II) the activator is one compound or a sequential mixture of two different compounds;

(III) each activator compound has the formula $Al(R_n)X_{(3-n)}$ wherein each R is independently a saturated aliphatic hydrocarbon radical having 1 to 14 carbon atoms; each X is independently chlorine, bromine, or iodine; and n is 1 to 3;

(IV) the activation of the precursor is essentially completed prior to the introduction of the precursor into the reactor; and (V) no additional activator is introduced into the reactor(s).

DESCRIPTION OF THE PREFERRED EMBODIMENT(S)

The gaseous materials used in the process can be introduced into the reactors via a recycle gas. The recycle gas is defined as a mixture of gases including ethylene per se or ethylene and one or more alpha-olefins, preferably one or two alpha-olefins, as comonomers and, optionally, one or more inert gases such as nitrogen (to make up the desired reactor pressure), inert hydrocarbons, and hydrogen. The alpha-olefins can be, for example, propylene, 1-butene, 1-hexene, 4-methyl-1-pentene, and 1-octene. The alpha-olefins usually have no more than 12 carbon atoms, and preferably, 3 to 8 carbon atoms. The recycle gas can also be referred to as the inlet gas or cycle gas.

The catalyst system can be exemplified by one where the precursor is formed by spray drying and used in slurry form. Such a catalyst precursor, for example, contains titanium, magnesium, and an electron donor, and, optionally, an aluminum halide. The precursor is introduced into a hydrocarbon medium such as mineral oil to provide a slurry. This spray dried catalyst is described in U.S. Pat. No. 5,290,745. Other processes are described in U.S. Pat. Nos. 5,601,742 and 4,482,687. In whichever manner the catalyst precursor is produced, the precursor is preferably suspended in an inert, high viscosity fluid, e.g., a moderately high viscosity mineral oil, to allow efficient blending of the activator compound.

A typical magnesium/titanium based catalyst system can be described as follows:

The precursor can have the formula $Mg_d Ti(OR)_e X_f (ED)_g$ wherein R is an aliphatic or aromatic hydrocarbon radical having 1 to 14 carbon atoms or COR' wherein R' is an aliphatic or aromatic hydrocarbon radical having 1 to 14 carbon atoms; each OR group is the same or different; X is independently chlorine, bromine or iodine; ED is an electron donor; d is 0.5 to 56; e is 0, 1, or 2; f is 2 to 116; and g is 1.5d+2. It is prepared from a titanium compound, a magnesium compound, and an electron donor. Titanium compounds, which are useful in preparing these precursors, have the formula $Ti(OR)_e X_h$ wherein R, X, and e are as defined above; h is an integer from 1 to 4; and e+h is 3 or 4. Some specific examples of titanium compounds are $TiCl_3$; $TiCl_4$; $Ti(OC_2H_5)_2 Br_2$; $Ti(OC_6H_5)Cl_3$; and $Ti(OCOCH_3)Cl_3$. $TiCl_3$ and $TiCl_4$ are preferred compounds. The magnesium compounds include magnesium halides such as $MgCl_2$, $MgBr_2$, and $MgI_2$. Anhydrous $MgCl_2$ is a preferred compound. About 0.5 to about 56, and preferably about 1 to about 10, moles of the magnesium compounds are used per mole of titanium compound.

The electron donor is an organic Lewis base, liquid at temperatures in the range of about 0 degrees C. to about 200 degrees C., in which the magnesium and titanium compounds are soluble. The electron donor can be an alkyl ester of an aliphatic or aromatic carboxylic acid, an aliphatic ketone, an aliphatic amine, an aliphatic alcohol, an alkyl or cycloalkyl ether, or mixtures thereof, each electron donor having 2 to 20 carbon atoms. Among these electron donors, the preferred are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethanol, 1-butanol, ethyl formate, methyl acetate, ethyl anisate, ethylene carbonate, tetrahydropyran, and ethyl propionate. Alcohol containing electron donors which react with the transition metal halide compounds are not preferred.

While an excess of electron donor is used initially to provide the reaction product of titanium compound and electron donor, the reaction product finally contains about 1 to about 20 moles of electron donor per mole of titanium compound and preferably about 1 to about 10 moles of electron donor per mole of titanium compound.

The activators that can be used in the invention are compounds of the formula $R_n AlX_{3-n}$. Compounds of the formula $R_n BX_{3-n}$ (where n is 0 to 2) are typical Lewis acids, which are not activator compounds, but are useful in the instant invention. The activator/Lewis acid compounds are added preferably in the same inert diluent as the catalyst precursor. The precursor activator used in the pre-activation can be one compound or a mixture of two different compounds. Each compound can have the formula $(R_n)AlX_{(3-n)}$ wherein each R is independently a saturated aliphatic hydrocarbon radical having 1 to 14 carbon atoms; each X is a halogen, preferably independently chlorine, bromine, or iodine; and n is 1 to 3. Examples of the R radical are methyl, ethyl, n-butyl, isobutyl, n-hexyl and n-octyl. Preferred activators include diethyl aluminum chloride, triethyl aluminum, tri-n-hexyl aluminum, dimethyl aluminum chloride, and tri-n-octyl aluminum. Particularly preferred activators are: a sequential mixture of tri-n-hexylaluminum and diethylaluminum chloride; a sequential mixture of tri-ethylaluminum and diethylaluminum chloride; a sequential mixture of diethylaluminum chloride and tri-n-hexylaluminum; a sequential mixture of diethylaluminum chloride and triethylaluminum; and either diethyl aluminum chloride or tri-n-hexyl aluminum.

In the sequential mixture, it is preferred to have the first precursor activator (Activator 1) of the formula $AlR_3$ and the second precursor activator (Activator 2) of formula $Al(R_n)X_{(3-n)}$ wherein R, X, and n are the same as above. Preferred mole ratios of Activator 2 to Activator 1 range from about 1:1 to about 6:1.

The activators can also be represented by the formulas $R_3Al$ or $R_2AlX$ wherein each R is independently alkyl, cycloalkyl, aryl, or hydrogen; at least one R is hydrocarbyl; and two or three R radicals can be joined to form a heterocyclic structure. Each R, which is a hydrocarbyl radical, can have 1 to 20 carbon atoms, and preferably has 1 to 10 carbon atoms. X is a halogen, preferably chlorine, bromine, or iodine.

Examples of hydrocarbyl aluminum activators, in addition to those mentioned above, are as follows: tri-isobutylaluminum, di-isobutyl-aluminum hydride, dihexyla-luminum hydride, di-isobutyl-hexylaluminum, isobutyl dihexylaluminum, trimethylaluminum, tripropylaluminum, triisopropylaluminum, tri-n-butylaluminum, tridecylaluminum, tridodecylaluminum, tribenzylaluminum, triphenylaluminum, trinaphthylaluminum, tritolylaluminum, isoprenylaluminum, dibutylaluminum chloride, diisobutylaluminum chloride, and ethylaluminum sesquichloride.

Essentially complete activation of the precursor is carried out prior to the introduction of the precursor into the reactor. Depending on specific chemical equilibria, the total amount of activator can range from about 1 mole of activator per mole of electron donor to about 2 moles of activator per mole of electron donor. This ratio also applies to each activator when two activators are used, but the total amount of activator(s) will not be in excess of this ratio. It will be understood that after this activation, no additional activators are added to the reactor(s).

In a preferred mode (sometimes referred to as an in-line reduction system), the precursor is introduced into a hydrocarbon solvent slurry feed tank; the slurry then passes to a static mixer immediately downstream of an activator injection port where the slurry is mixed with the activator; then the mixture passes to a second static mixer immediately downstream of a second activator injection port where it is mixed with the second activator. The second activator is optional, but preferred. The mixture then passes to another mixer, preferably of the same kind, where it is topped-off with a small amount of activator sufficient to complete activation of the precursor, i.e., an amount sufficient to alkylate the active site and promote polymerization. A small additional amount may also be included to counteract impurities found in the polymerization system; however, this amount is inclusive in the overall Al:Ti atomic ratio, i.e., about 1:1 to about 15:1, preferably about 1:1 to about 10:1, and is not in excess of that ratio.

The static mixer element is preferably mounted vertically to prevent solids accumulation in the mixer. It makes no difference which direction the flow is going, however. A 32 element static mixer in ½ inch tube size is highly efficacious. The 32 element mixer (overall length is 24.75 inch) will have a relatively low pressure drop while still providing intimate mixing of the fluid elements. The static mixer element is preferably located downstream of the injection point of alkyl reducing agent to the precursor slurry. There is no requirement that the mixer element be within a certain minimum distance of the mix point; however, any distance from a few inches to a few feet may be acceptable depending on the overall system layout and dimensions. The static mixer element may be jacketed or not. In any case, the system should, at a minimum, be insulated to prevent heat loss to the environment. Acceptable mixing can be provided by a 2 foot (32 element) Kenics™ static mixer. This low energy mixer functions by constantly dividing the flow and reversing flow directions in a circular pattern in the direction of the flow in the tube associated with the mixer. Depending on the activator used, some reaction time may be required for the reaction of the activator with the catalyst precursor. This is conveniently done using a residence time zone, which can consist either of an additional length of slurry feed pipe or an essentially plug flow holding vessel. A residence time zone can be used for both activators, for only one or for neither, depending entirely on the rate of reaction between activator and catalyst precursor. See discussion of residence time pots below. The entire mixture, after the topping-off step, is then introduced into the reactor, usually at the same time as the flow of ethylene is initiated.

It is noted that due to the high viscosity of the slurry, heat transfer is relatively poor (the Reynolds number is in the 1 to 10 range). Degradation can begin to occur at temperatures higher than 60 degrees C. Thus, activation is normally effected at temperatures in the range of about 10 to about 60 degrees C., preferably about 30 to about 45 degrees C. In any case, good mixing is needed to maintain constant temperatures and allow for completion of the reaction in view of the prevalent low mass transfer coefficients in high viscosity systems. Intense high energy input mixing, mixing by injection into a flowing stream, and mixing by diffusion are not recommended.

To assure a uniform final catalyst precursor, it is important that the flow through the mixing devices be as close to plug flow as possible. In addition, some of the reactions require finite amounts of time to proceed to completion so it is also necessary to provide residence time in the system. Although this can be accomplished by use of long loops of pipe or tubing, the risk of catalyst precursor settling out during unavoidable outages in catalyst feed and the high pressure drop that this will cause makes this highly impractical. Instead, the process of the invention is preferably carried out utilizing residence time pots designed to promote plug flow while retaining the catalyst slurry in suspension.

The design of the residence time pot is such that it will promote uniform (or close to uniform) residence times as well as constant temperature. Since plug flow is desired, designs which promote back mixing are definitely not preferred. Although some back mixing will naturally occur in tubing lines (due to velocity gradients-a natural consequence of being totally in laminar flow), this is of relatively minor impact. Axial mixing in the residence time pots is minimized by maintaining a high aspect ratio [a preferred L/D (length to diameter ratio) of about 10 to about 15]. This results in a low velocity in the residence time pot and minimal back mixing due to velocity gradients in laminar flow.

Some homogenization of the slurry occurs at the transition section from the residence time pot to the smaller diameter feed lines. Additional radial mixing is preferably provided by small impellers, which are located near the bottom of the residence time pot. The impeller promotes some radial mixing, but mainly assures that the bottom section of the residence time pot does not experience suspended solid buildup.

After activator has been added to the catalyst precursor slurry in one or two steps, additional activator is added as a last step prior to entry into the reactor. Preferably, this addition occurs within 30 minutes and preferably within less than 15 minutes of actual injection of the catalyst precursor slurry into the reactor. The activator can be in solution in an inert solvent (such as a high viscosity fluid carrier or a lower viscosity solvent) or added as pure component. It is essential that a mixer, preferably an additional static mixer element, be located immediately downstream of the addition point of the additional activator. It is also important to keep the slurry flowing to assure that no plugs form in the catalyst feed line. Additional activator is fed to provide for sufficient activation of the catalyst plus a small additional amount to scavenge impurities in the polymerization reactor. The total amount of this additional "topping off" activator can be about 0.1 to about 75 percent by mol of the total amount of the activator used for the activation of the precursor. Addition of all of the activator to the catalyst precursor eliminates mass transfer problems, which would prevent the activator from reaching the catalyst precursor if separate addition to the reactor was practiced. This practice leads to extremely efficient utilization of activator and improved polymer product properties. After completion of the mixing of activator with catalyst precursor, direct injection into the reactor occurs. Means of feeding a slurry to a gas phase reactor are well known and described in the art (see European Patent Application 635 521, for example).

The hydrocarbon used for the formation of the slurry can be any essentially air and moisture free aliphatic or aromatic hydrocarbon which is unreactive with the catalyst precursor, the precursor activator compounds, and the cocatalyst. In practice, since many of the final polymer products find end uses in food packaging, aromatic hydrocarbons would not be a preferred slurry solvent. The hydrocarbon slurry solvent is typically chosen from hydrogenated "mineral oils" or naphthenic oils of relatively high viscosity to minimize settling of catalyst solids in feed tubes and the like, although, with appropriate engineering design, lower viscosity solvents such as isopentane, hexane, and heptane can be used as slurry solvents. These are not particularly preferred due to the additional complexity introduced by use of a lower viscosity and more easily settled slurry as catalyst. The viscosity of the hydrocarbon slurry solvent, however, is sufficiently low so that the slurry can be conveniently pumped through the pre-activation apparatus and eventually into the polymerization reactor. Preferred solvents are aliphatic hydrocarbons with viscosity greater than about 50 centipoises (cps), particularly greater than about 100 cps and less than about 5,000 cps. Particularly preferred solvents are napthenic mineral oils typified by materials such as the Kaydol series of food grade mineral oils supplied by Witco under the trademark Kaydol® 350 and 550.

It is preferred not to use a support. However, in those cases where it is desired to support the precursor, silica is the preferred support. Other suitable supports are inorganic oxides such as aluminum phosphate, alumina, silica/alumina mixtures, silica modified with an organoaluminum compound such as triethylaluminum, and silica modified with diethyl zinc. A typical support is a solid, particulate, porous material essentially inert to the polymerization. It is used as a dry powder having an average particle size of about 10 to about 250 microns and preferably about 30 to about 100 microns; a surface area of at least 200 square meters per gram and preferably at least about 250 square meters per gram; and a pore size of at least about 100 angstroms and preferably at least about 200 angstroms. Generally, the amount of support used is that which will provide about 0.1 to about 1.0 millimole of titanium per gram of support and preferably about 0.4 to about 0.9 millimole of titanium per gram of support. Impregnation of the above mentioned catalyst precursor into a silica support can be accomplished by mixing the precursor and silica gel in the electron donor solvent or other solvent followed by solvent removal under reduced pressure. The resultant solid catalyst is then converted into a free flowing slurry with an aliphatic hydrocarbon as described above such that it is pumpable as a liquid into the process. Catalyst precursors such as those described in U.S. Pat. No. 5,290,745 and European Patent Application 771 820 are particularly useful in the process of subject invention when placed into a hydrocarbon slurry in the unactivated state.

The polymerization is conducted in the gas phase using a continuous fluidized bed process.

Melt index is determined under ASTM D-1238, Condition E. It is measured at 190° C. and 2.16 kilograms and reported as grams per 10 minutes or decigrams per minute. Flow index is determined under ASTM D-1238, Condition F. It is measured at 190° C. and 10 times the weight used in determining the melt index, and reported as grams per 10 minutes or decigrams per minute. Melt flow ratio is the ratio of flow index to melt index. The product, as removed from the reactor, can have a melt index in the range of about 0.02 to about 300 grams per 10 minutes, and preferably has a melt index in the range of about >0.04 to about 50 grams per 10 minutes. The melt flow ratio is in the range of about 20 to about 50, and is preferably in the range of about 20 to about 30. The density of the polymer is normally at least 0.900 gram per cubic centimeter, and is preferably in the range of 0.915 to 0.960 gram per cubic centimeter. The bulk density can be in the range of about 18 to about 32 pounds per cubic foot, and is preferably greater than 22 pounds per cubic foot. The molecular weight distribution of the polymer is reflected in an Mw/Mn of about 3 to about 7. Mw is the weight average molecular weight; Mn is the number average molecular weight; and the Mw/Mn ratio can be referred to as the polydispersity index, which is a measure of the breadth of the molecular weight distribution. Mw/Mn can also be related to MFR, with lower values of MFR indicated lower values of Mw/Mn and a narrower molecular weight distribution.

The transition metal based catalyst system including the activated precursor, ethylene, and, optionally, alpha-olefin and hydrogen are continuously fed into the reactor, and the final product is continuously removed from the reactor.

In the reactor:

The mole ratio of alpha-olefin (if used) to ethylene can be in the range of about 0.01:1 to about 0.8:1, and is preferably in the range of about 0.02:1 to about 0.35:1. The mole ratio of hydrogen (if used) to ethylene can be in the range of about 0.001:1 to about 2:1, and is preferably in the range of about 0.01 to about 0.5:1. Preferred operating temperatures vary depending on the density desired, i.e., lower temperatures for lower densities and higher temperatures for higher densities.

The pressure, i.e., the total pressure in the reactor, can be in the range of about 200 to about 500 psig (pounds per square inch gauge) and is preferably in the range of about 280 to about 450 psig. The ethylene partial pressure can be in the range of about 10 to about 150 psig, and is preferably in the range of about >20 to about 120 psig. The balance of the total pressure is provided by alpha-olefin (if used) and an inert gas such as nitrogen. Other inert hydrocarbons, such as an induced condensing agent e.g., isopentane, hexane also contribute to the overall pressure in the reactor according to their vapor pressure under the temperature and pressure experienced in the reactor. A typical fluidized bed reactor can be described as follows:

The bed is usually made up of the same granular resin that is to be produced in the reactor. Thus, during the course of the polymerization, the bed comprises formed polymer particles, growing polymer particles, and catalyst particles fluidized by polymerization and modifying gaseous components introduced at a flow rate or velocity sufficient to cause the particles to separate and act as a fluid. The fluidizing gas is made up of the initial feed, make-up feed, and cycle (recycle) gas, i.e., comonomers and, if desired, modifiers and/or an inert carrier gas.

The essential parts of the reaction system are the vessel, the bed, the gas distribution plate, inlet and outlet piping, a compressor, cycle gas cooler, and a product discharge system. In the vessel, above the bed, there is a velocity reduction zone, and, in the bed, a reaction zone. Both are above the gas distribution plate.

A typical fluidized bed reactor is further described in U.S. Pat. No. 4,482,687.

The gaseous feed streams of ethylene, other gaseous alpha-olefins (if used), and hydrogen (if used) are preferably fed to the reactor recycle line as well as liquid alpha-olefins (if used). The activated catalyst precursor is preferably injected into the fluidized bed as a solid or a mineral oil slurry. The product composition can be varied by changing the molar ratios of the comonomers introduced into the fluidized bed. The product is continuously discharged in granular or particulate form from the reactor as the bed level builds up with polymerization. The production rate is controlled by adjusting the catalyst feed rate and/or the ethylene partial pressures.

The hydrogen:ethylene mole ratio can be adjusted to control average molecular weights. The alpha-olefins (other than ethylene) can be present in a total amount of up to 15 percent by weight of the copolymer and, if used, are preferably included in the copolymer in a total amount of about 1 to about 10 percent by weight based on the weight of the copolymer.

The residence time of the mixture of reactants including gaseous and liquid reactants, catalyst, and resin in the fluidized bed can be in the range of about 1 to about 12 hours and is preferably in the range of about 2 to about 5 hours.

The reactor can be run in the condensing mode, if desired. The condensing mode is described in U.S. Pat. Nos. 4,543,399; 4,588,790; and 5,352,749.

The resin can be extruded in a conventional extruder adapted for that purpose. Extruders and processes for extrusion are described in U.S. Pat. Nos. 4,814,135; 4,857,600; 5,076,988; and 5,153,382. Examples of various extruders, which can be used in forming film are a single screw type such as one modified with a blown film die and air ring and continuous take off equipment, a blown film extruder, and a slot cast extruder. A typical single screw type extruder can be described as one having a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and multiple heating zones from the rear heating zone to the front heating zone, the multiple sections and zones running from upstream to downstream. If it has more than one barrel, the barrels are connected in series. The length to diameter ratio of each barrel is in the range of about 16:1 to about 30:1. The extrusion can take place at temperatures in the range of about 160 to about 270 degrees C., and is preferably carried out at temperatures in the range of about 180 to about 240 degrees C.

The advantages of the invention are found in that molecular weight distribution can be narrowed and hexane extractables can be decreased without a decrease in hydrogen response and catalyst activity; there is no rapid increase in reaction rate, which can result in sheeting, chunking, and cessation of operation; reduction of the cocatalyst, i.e., activator, requirement; improved process control; the precursor is less sensitive to over-reduction; catalyst fines are all active so they are less likely to segregate and migrate to the reactor wall to form sheets; facilitates activator change where different products are desired; the process allows for complete activation even where the activator has very low (or nil) vapor pressure such as tri-n-hexyl aluminum; the process allows the use of less expensive activators such as triethylaluminum and triusobutylaluminum; eliminates the need for separate cocatalyst feed; although the process is primarily focused on higher molecular weight (and lower levels of low molecular weight species), narrow molecular weight distribution products for fabrication into film, the process has broader application to higher melt index products, typically resins used in injection molding; eliminates other forms of catalyst premixing, often a unit operation; and allows for quick changes of catalyst by changing relative flow rates of precursor and activator.

Conventional additives, which can be introduced into the resin product, are exemplified by antioxidants, ultraviolet absorbers, pigments, dyes, nucleating agents, fillers, slip agents, fire retardants, plasticizers, processing aids, lubricants, stabilizers, smoke inhibitors, viscosity control agents, and crosslinking agents, catalysts, and boosters, tackifiers, and anti-blocking agents. Aside from the fillers, the additives can be present in the blend in amounts of about 0.1 to about 10 parts by weight of additive for each 100 parts by weight of polymer blend. Fillers can be added in amounts up to 200 parts by weight and more for each 100 parts by weight of the blend.

Patents, patent applications, and other publications mentioned in this specification are incorporated by reference herein.

Molecular weights are weight average molecular weights unless otherwise noted.

The invention is illustrated by the following examples.

EXAMPLES 1 to 4

Examples 1 to 4 are embodiments of the invention. In these examples, a small polymerization reaction system, as described in U.S. Pat. No. 5,290,745 and references contained therein, is used. Instead of manipulating the activator/ electron donor ratios in an in-line fashion as indicated in the discussion of the preferred mode, the partially activated precursors are prepared in a batch fashion due to the extreme difficulty encountered in metering activator compound flows which would be at rates of about 1 to 3 cubic centimeters per hour. These results are illustrative of the effect of the invention in manipulating polymer properties in an in-line fashion over a larger range of polymer MFR (melt flow ratio), hexane extractables, and polymer bulk density. The smaller reaction system is used illustratively to avoid experimentation in large commercial equipment, which can result in large amounts of off-specification polymer during the experiment. The results described below, however, are directly scalable to large scale commercial reaction systems. Note: ratios are mole ratios unless otherwise stated.

Catalyst Precursor Preparation

A titanium trichloride containing catalyst precursor is prepared in a 1900 liter vessel equipped with pressure and temperature controls and a turbine agitator. A nitrogen atmosphere (less than 5 ppm $H_2O$) is maintained at all times. 1480 liters of anhydrous tetrahydrofuran (THF, the internal electron donor) containing less than 40 ppm $H_2O$ are added to the vessel. The THF is heated to a temperature of 50 degrees C., and 1.7 kilograms of granular magnesium metal (70.9 gram atoms) are added, followed by 27.2 kilograms of titanium tetrachloride (137 mols). The magnesium metal has a particle size in the range of from 0.1 to 4 millimeters. The titanium tetrachloride is added over a period of about one-half hour.

The mixture is continuously agitated. The exotherm resulting from the addition of titanium tetrachloride causes the temperature of the mixture to rise to approximately 72 degrees C. over a period of about three hours. The temperature is held at about 70 degrees C. by heating for approximately another four hours. At the end of this time, 61.7 kilograms of magnesium dichloride (540 moles) are added and heating is continued at 70 degrees C. for another eight hours. The mixture (solution) is then filtered through a 100 micron filter to remove undissolved magnesium dichloride and unreacted magnesium (less than 0.5 percent by weight).

100 kilograms of fumed silica having a particle size in the range of from 0.1 to 1 microns are added to the mixture prepared above over a period of about two hours. The mixture is stirred by means of a turbine agitator during this time and for several hours thereafter to thoroughly disperse the silica in the solution. The temperature of the mixture is held at 70 degrees C. throughout this period and a nitrogen atmosphere is maintained at all times.

The resulting slurry is spray dried using an 8-foot diameter closed cycle spray dryer equipped with a rotary atomizer. The rotary atomizer is adjusted to give catalyst particles with a D50 of 18 microns. The scrubber section of the spray dryer is maintained at approximately minus 4 degrees C.

Nitrogen gas is introduced into the spray dryer at an inlet temperature of 165 degrees C. and is circulated at a rate of approximately 1700 kilograms per hour. The catalyst slurry is fed to the spray dryer at a temperature of about 35 degrees C. and a rate of 90 to 95 kilograms per hour, or sufficient to yield an outlet gas temperature of approximately 125 degrees C. The atomization pressure is slightly above atmospheric. Discrete spray dried catalyst precursor particles are formed.

The spray dried catalyst precursor contains 2.5 weight percent Ti, 6.3 weight percent Mg, and 25 to 29 weight percent THF. The particles have a D50 of 14 microns and a span [(D90-D10)/D50] ranging from 0.75 to 1.25 as determined by means of a Leeds and Northrup Microtrac® particle size analyzer using a dodecane solvent, The discrete catalyst precursor particles are mixed with mineral oil under a nitrogen atmosphere in a 400 liter vessel equipped with a turbine agitator to form a slurry containing approximately 28 weight percent of the solid catalyst precursor.

To partially activate the catalyst slurry, a 50 weight percent solution of tri-n-hexylaluminum (TnHAl) in mineral oil is added to the slurry followed by mixing for approximately ½ hour. The TnHAl solution is employed in an amount sufficient to provide 0.20 mole of TnHAl per mole of THF in the catalyst. Sequentially, then a 30 weight percent solution of diethylaluminum chloride (DEAC) in mineral oil is added and the mixture is mixed and held for approximately 1 hour. The DEAC is employed in an amount sufficient to provide 0.45 mole of DEAC per mole of THF in the catalyst. The mole ratio of total activator (TnHAl plus DEAC) to THF is 0.65:1.

Ethylene is copolymerized with 1-butene in a fluidized bed reactor as described in U.S. Pat. No. 4,349,648. Each polymerization is continuously conducted after equilibrium is reached under conditions set forth in Table I. Polymerization is initiated in the reactor by continuously feeding the above preactivated catalyst precursor into a fluidized bed of polyethylene granules together with ethylene, 1-hexene, and hydrogen. In example 1, an activator (in this case, a cocatalyst) is dissolved in isopentane (iC5) and fed to reactor separately from the preactivated catalyst.

Example 1 is repeated in examples 2 to 4 with the exception that the activator is now admixed with the catalyst in a final step prior to addition to the reactor. Preactivated catalyst and triethylaluminum activator are mixed in-line for approximately 1 to 1.5 minutes. No external activator is fed to the reactor. The reaction conditions are set forth in Table I. The MFR and the bulk density are shown in Table II. It will be noted that the MFR and bulk density of the blend change with changes in the total activator/electron donor mole ratio with little change in other polymer properties or reaction conditions. Although the change in MFR is small, changes of this kind can have significant effects on end use properties as indicated in U.S. Pat. No. 4,349,648, mentioned above. The change in settled bulk density is greater with the highest bulk density (example 4) occurring at the lowest total activator/electron donor mole ratio.

TABLE I

| REACTION CONDITIONS | Example | | | |
|---|---|---|---|---|
| | 1 Control | 2 | 3 | 4 |
| Temperature (° C.) | 88 | 88 | 88 | 88 |
| Pressure (psia) | 350 | 350 | 350 | 350 |
| Comonomer Type | 1-butene | 1-butene | 1-butene | 1-butene |
| C2 Partial Pressure (psia) | 90 | 90 | 90 | 90 |
| H2/C2 Mole Ratio | 0.130 | 0.125 | 0.125 | 0.180 |
| C4/C2 Mole Ratio | .340 | .340 | .350 | .360 |
| Recycle iC5 Mole % | 6.0 | 5.8 | 5.6 | 5.5 |
| Cocatalyst Type | TEAL | TEAL | TEAL | TEAL |
| Drum Avg. Prod. Rate (lbs/hr) | 26 | 24 | 20 | 20 |
| Heat Balance Prod Rate (lbs/hr) | 26 | 24 | 23 | 21 |
| SGV (ft/sec) | 1.7 | 1.7 | 1.7 | 1.7 |
| Bed Weight (lbs) | 80 | 80 | 80 | 80 |
| Reactor Residence time (hrs) | 3.1 | 3.3 | 4.0 | 4.0 |
| Catalyst Carrier (iC5 or N2) | 3 pph iC5 or 3 pph N2 | 3 pph iC5 or 3 pph N2 | 3 pph iC5 or 3 pph N2 | 3 pph iC5 or 3 pph N2 |
| Precontacting Residence time (min) | 0 | 1.3 | 1.3 | 1.3 |

TABLE II

| RESIN PROPERTIES | Example | | | |
|---|---|---|---|---|
| | 1 | 2 | 3 | 4 |
| Melt Index, I2 (dg/min) | 1.12 | 1.07 | 0.90 | 1.08 |
| Density (g/cm3) | .9195 | .9182 | .9185 | .9190 |
| MFR | 26.2 | 26.0 | 26.0 | 24.9 |
| Residual Al (ppm) | 32 | 41 | 24 | 12 |
| Residual Ti (ppm) | 1.12 | 1.35 | 1.43 | 1.47 |
| Total Al/Ti | 50 | 53 | 30 | 14 |
| Added Al/Ti | 45.4 | 48.6 | 24.7 | 9.5 |
| Total Activator/ED | 6.8 | 7.2 | 4.0 | 1.9 |
| Added Activator/ED | 6.1 | 6.5 | 3.3 | 1.3 |
| Settled Bulk Density | 22.7 | 23.8 | 25.5 | 27.7 |
| Average particle size (APS) (inches) | .032 | .020 | .020 | .019 |
| Fines < 120 mesh, (wt %) | 1 | 1 | 1 | 1 |

EXAMPLES 5 to 9

Examples 5 to 9 are also embodimets of the invention. Catalyst is prepared as in Example 1. The same reaction system is used. In these examples, however, 1-hexene is used as comonomer and trimethylaluminum as activator. In the control (example 5), the activator (cocatalyst) is fed separately to the fluidized bed as a solution in isopentane.

Examples 6 to 9 utilize activator mixed directly with the preactivated catalyst in-line prior to introduction to the reactor. Since all of these examples use trimethylaluminum as activator, the effect of the invention on MFR is more difficult to ascertain since this particular activator normally gives low MFR values under any set of circumstances. The effect on bulk density, however, is still clear as is the relatively high catalyst productivity observed, even at very low Al/Ti levels. Variables and results can be found in Tables III and IV.

COMPARATIVE EXAMPLES 1 to 8

Comparative Examples 1 to 8 variables and results are given in Tables V and VI. Catalyst, prepared as in Example 1 is used in Comparative Examples 2, 4, 7, and 8. An impregnated version of the basic catalyst as described in U.S. Pat. No. 5,068,489 is used in Comparative Examples 1, 3, 5, and 6. In the examples using a silica impregnated catalyst, the catalyst is introduced to the reactor as a dry powder. In Comparative Examples 2, 4, 7, and 8, the catalyst is fed to the reactor as a slurry. In these examples, the activator (cocatalyst) is fed separately to the polymerizing bed. The spray dried slurry fed catalyst of Comparative Examples 2, 4, 7, and 8 is normally of higher productivity and hence lower residual titanium level than the silica impregnated catalyst. This is illustrated by comparing Comparative Examples 1 and 2. Note, that despite similar reaction conditions, much higher residual titanium levels are observed at these low activator:Ti molar ratios, even though the activator:ED molar ratios are much higher than those in Examples 1 to 9 illustrating the invention; also note the substantially lower residual titanium for the catalysts of the invention. Thus, a much more efficacious use of cocatalyst activator is achieved by the process of the invention, as well as achieving the same results in terms of reduced MFR [i.e., narrower molecular weight distribution (MWD) and lower hexane extractables]. Both catalyst productivity and activator utilization effectiveness are improved through addition of the activator directly with the activated catalyst precursor composition in a hydrocarbon slurry.

TABLE III

| REACTION CONDITIONS | Example | | | | |
|---|---|---|---|---|---|
| | 5 Control | 6 | 7 | 8 | 9 |
| Temperature (° C.) | 88 | 88 | 88 | 88 | 88 |
| Pressure (Psia) | 350 | 350 | 350 | 350 | 350 |
| Comonomer Type | Hexene | Hexene | Hexene | Hexene | Hexene |
| C2 Partial Pressure (Psia) | 90 | 90 | 90 | 90 | 90 |
| H2/C2 Mole Ratio | 0.120 | 0.120 | 0.130 | 0.130 | 0.140 |
| C6/C2 Mole Ratio | 0.100 | 0.100 | 0.100 | 0.100 | 0.100 |
| Recycle iC5 Mole % | 6.0 | 5.9 | 6.0 | 6.0 | 6.0 |
| Cocatalyst Type | TMA | TMA | TMA | TMA | TMA |
| Drum Avg. Prod. Rate (lb/hr) | 22 | 20 | 20 | 20 | 20 |
| Heat Balance Prod Rate (lb/hr) | 23 | 21 | 20 | 20 | 19 |
| SGV (ft/sec) | 1.7 | 1.7 | 1.7 | 1.7 | 1.7 |
| Bed Weight (lbs) | 80 | 80 | 80 | 80 | 80 |
| Reactor Residence time (hrs) | 3.6 | 4.0 | 4.0 | 4.0 | 4.0 |
| Catalyst Carrier (N2 or iC5) | 3 pph iC5/ 3 pph N2 | 3 pph iC5/ 3 pph N2 | 3 pph iC5/ 3 pph N2 | 3 pph iC5/ 3 pph N2 | 3 pph iC5/ 3 pph N2 |
| Precontacting Residence time (min) | 0 | 1.3 | 1.3 | 1.3 | 1.3 |

TABLE IV

| RESIN PROPERTIES | Examples | | | | |
|---|---|---|---|---|---|
| | 5 | 6 | 7 | 8 | 9 |
| Melt Index, I2 (dg/min) | 0.51 | 0.47 | 0.46 | 0.43 | 0.37 |
| Density (g/cm3) | .9249 | .9248 | .9250 | .9246 | .9242 |
| MFR | 25.2 | 25.8 | 25.2 | 25.7 | 25.6 |
| Residual Al (ppm) | 21 | 22 | 15 | 11 | 5 |
| Residual Ti (ppm) | 1.54 | 1.55 | 1.53 | 1.61 | 1.64 |
| Total Al/Ti | 24 | 25 | 17 | 12 | 5 |
| Added Al/Ti as Cocatalyst | 19.2 | 20.1 | 12.4 | 7.2 | 0.5 |
| Total Activator/ED | 3.2 | 3.4 | 2.3 | 1.6 | 0.7 |
| Added Activator/ED | 2.6 | 2.7 | 1.7 | 1.0 | 0.1 |
| Settled Bulk Density | 27.1 | 27.3 | 27.4 | 27.6 | 28.5 |

TABLE IV-continued

| RESIN PROPERTIES | Examples | | | | |
|---|---|---|---|---|---|
| | 5 | 6 | 7 | 8 | 9 |
| APS (inches) | .017 | .018 | .017 | .018 | .018 |
| Fines < 120 mesh, (wt %) | 4 | 4 | 5 | 4 | 4 |

TABLE V

| | Comparative Example | | | | | | | |
|---|---|---|---|---|---|---|---|---|
| | 1 | 2 | 3 | 4 | 5 | 6 | 7 | 8 |
| CATALYST INFORMATION | | | | | | | | |
| Catalyst Type | Supported | Spray Dried | Supported | Spray Dried | Supported | Supported | Spray Dried | Spray Dried |
| Activator Ratios | 45/20 | 45/20 | 45/20 | 45/20 | 40/30 | 40/30 | 40/30 | 40/30 |
| Activator 1 to ED mole ratio | TnHAL: 0.2 | TnHAL: 0.2 | TnHAL: 0.2 | TnHAL: 0.2 | TnHAL: 0.3 | TnHAL: 0.3 | TnHAL: 0.3 | TnHAL: 0.3 |
| Activator 2 to ED mole ratio | DEAC: 0.45 | DEAC: 0.45 | DEAC: 0.45 | DEAC: 0.45 | DEAC: 0.40 Control | DEAC: 0.40 | DEAC: 0.40 | DEAC: 0.40 |
| REACTION CONDITIONS | | | | | | | | |
| Temperature (° C.) | 87 | 87 | 87 | 87 | 88 | 88 | 88 | 88 |
| Pressure (psia) | 350 | 350 | 350 | 350 | 350 | 350 | 350 | 350 |
| Comonomer Type | Hexene | Hexene | Hexene | Hexene | Hexene | Hexene | Hexene | Hexene |
| C2 Partial Pressure (psia) | 95 | 130 | 130 | 130 | 100 | 100 | 100 | 100 |
| H2/C2 Mole Ratio | 0.130 | 0.120 | 0.166 | 0.183 | 0.187 | 0.185 | 0.160 | 0.160 |
| C6/C2 MoleRatio | .140 | .125 | .112 | .125 | 0.157 | 0.150 | 0.150 | 0.150 |
| Cocatalyst Feed Location | Bed | Bed | Bed | Bed | | | | |
| Cocatalyst Type | TEAL | TEAL | TMA | TMA | | | | |
| Activator Feed Location | | | | | Into Bed | Into Bed | Into Bed | Into Bed |
| Activator Type | | | | | TEAL | TEAL | TEAL | TEAL |

TABLE VI(A)

| Comparative Examples RESIN PROPERTIES | 1 | 2 | 3 | 4 |
|---|---|---|---|---|
| Melt Index, I2 (dg/min) | 0.90 | 0.90 | 1.00 | 1.00 |
| Density (g/cm3) | .9175 | .9161 | .9162 | .9168 |
| MFR | 29.0 | 28.3 | 26.7 | 26.5 |
| Residual Ti (ppm) | 3.10 | 1.14 | 3.03 | 2.29 |
| Added Al/Ti as Activator | 41.0 | 36.0 | 33.0 | 18.0 |
| Total Activator/ED | 6.8 | 5.3 | 5.5 | 3.0 |
| Added Activator/ED | 6.1 | 4.7 | 4.9 | 2.3 |
| Settled Bulk Density | 19.0 | 20.3 | 23.2 | 25.3 |
| APS (inches) | .034 | .026 | .028 | .019 |

TABLE VI(B)

| Comparative Examples RESIN PROPERTIES | 5 | 6 | 7 | 8 |
|---|---|---|---|---|
| Melt Index, I2 (dg/min) | 0.93 | 0.82 | 0.79 | 0.77 |
| Density (g/cm3) | .9170 | .9210 | .9182 | .9181 |
| MFR | 25.7 | 25.3 | 25.7 | 25.8 |
| Residual Ti (ppm) | 3.50 | 3.65 | 2.40 | 2.40 |
| Added Al/Ti as Activator | 19.0 | 29.0 | 20.0 | 20.0 |
| Total Activator/ED | 3.5 | 5.0 | 3.3 | 3.3 |

TABLE VI(B)-continued

| Comparative Examples RESIN PROPERTIES | 5 | 6 | 7 | 8 |
|---|---|---|---|---|
| Added Activator/ED | 2.8 | 4.3 | 2.6 | 2.6 |
| Settled Bulk Density | 25.0 | 24.0 | 24.5 | 24.5 |
| APS (inches) | .026 | .028 | .018 | .018 |

What is claimed is:

1. A process comprising contacting ethylene or ethylene and one or more comonomers in one or more fluidized bed reactors, under polymerization conditions, with a catalyst system comprising (i) a supported or unsupported magnesium/titanium based precursor in slurry form, said precursor containing an electron donor; and (ii) an activator containing aluminum in an amount sufficient to essentially complete the activation of the precursor, the method comprising:
  A) mixing the precursor and a portion of the activator prior to introduction into the reactor in at least one mixing procedure to prepare a partially activated precursor;
  B) mixing the partially activated precursor with the remainder of the activator to essentially complete the activation of the precursor and to prepare an essentially completely activated precursor;
  C) maintaining the mixture from (A) in slurry form; and
  D) introducing the mixture from (B) into the reactor with the following provisos:
    (i) the atomic ratio of aluminum to titanium is in the range of about 1:1 to about 15:1, and the mole ratio of activator to electron donor is about 1:1 to about 2:1;
    (ii) the activator is one compound or a mixture of two different compounds;
    (iii) each activator compound has the formula $Al(R_n)X_{(3-n)}$ wherein each R is independently a saturated aliphatic hydrocarbon radical having 1 to 14 carbon atoms; each X is independently chlorine, bromine, or iodine; and n is 1 to 3; and (iv) no additional activator is introduced into the reactor(s).

2. The process as claimed in claim 1 wherein, in each activator, R is selected from the group consisting of methyl, ethyl, n-butyl, isobutyl, n-hexyl, and n-octyl.

3. The process as claimed in claim 1 wherein each activator is selected from the group consisting of tri-ethyl aluminum, tri-n-butyl aluminum, tri-n-hexyl aluminum, tri-n octyl aluminum, triisobutyl aluminum, tri-methyl aluminum, diethyl aluminum chloride dimethyl aluminum chloride, and diusobutyl aluminum chloride.

4. The process as claimed in claim 1 wherein two mixing procedures are carried out in procedure (A), and the activator is a sequential mixture selected from the group consisting of a mixture of tri-n-hexylaluminum and diethylaluminum chloride; a mixture of triethylaluminum and diethylaluminum chloride; and a mixture of trimethylaluminum and dimethylaluminum chloride.

5. The process as claimed in claim 1 wherein the activator has the formula $R_3Al$ or $R_2AlX$ wherein each R is independently alkyl, cycloalkyl, aryl, or hydrogen; at least one R is hydrocarbyl; each hydrocarbyl has 1 to 20 carbon atoms; two or three R radicals can be joined to form a heterocyclic structure; and X is chlorine, bromine, or iodine.

6. The process as claimed in claim 1 wherein the atomic ratio of aluminum to titanium is in the range of about 1:1 to about 10:1.

* * * * *